United States Patent [19]
Arendt et al.

[11] Patent Number: 5,819,091
[45] Date of Patent: Oct. 6, 1998

[54] USER LEVEL CONTROL OF DEGREE OF CLIENT-SIDE PROCESSING

[76] Inventors: James Wendell Arendt, 1501 Blackjack Dr., Round Rock, Tex. 78681; Ravindranath Kasinath Manikundalam, 2406 Wood Chase Trail, Austin, Tex. 78728; James Michael Phelan, 3839 Dry Creek Dr., #121, Austin, Tex. 78731

[21] Appl. No.: 364,340

[22] Filed: Dec. 22, 1994

[51] Int. Cl.⁶ .................................................. G06F 9/40
[52] U.S. Cl. ................... 395/685; 395/186; 395/187.01; 395/188.01
[58] Field of Search .................................. 395/186, 685, 395/187.01, 188.01; 364/200

[56] References Cited

U.S. PATENT DOCUMENTS

| | | | |
|---|---|---|---|
| 4,731,750 | 3/1988 | Holflich et al. | 395/200.31 |
| 4,897,781 | 1/1990 | Chang et al. | 707/201 |
| 5,249,290 | 9/1993 | Heizer | 395/675 |
| 5,265,260 | 11/1993 | Hendricks | 707/7 |
| 5,339,430 | 8/1994 | Lundin et al. | 395/685 |
| 5,341,478 | 8/1994 | Travis, Jr. et al. | 395/200.33 |
| 5,483,649 | 1/1996 | Kuznetsov | 395/186 |
| 5,550,984 | 8/1996 | Gelb | 395/200.75 |
| 5,557,732 | 9/1996 | Thompson | 345/329 |
| 5,673,315 | 9/1997 | Wolf | 380/4 |

FOREIGN PATENT DOCUMENTS

| | | | |
|---|---|---|---|
| 0407060 | 6/1990 | European Pat. Off. | 12/14 |
| 0458718 | 4/1991 | European Pat. Off. | 12/14 |
| 2248324 | 9/1990 | United Kingdom | 12/14 |
| 2242295 | 12/1991 | United Kingdom | 12/14 |

OTHER PUBLICATIONS

Pending U. S. Patent Application, SN 07/978,947: "Method of and Apparatus for Providing a Client/Server Architecture" (Copy not provided).

Pending U. S. Patent Application, SN 08/223,276: "Method and System for Providing a Client/Server Interface in a Programming Language" (Copy not provided).

Pending U. S. Patent Application, SN 08/297,469: "Apparatus and Method for Managing a Server Workload According to Client Performance Goals in a Client/Server Data Processing System" (Copy not provided).

Published EPO Application No. WO93/18454 published Sep. 16, 1993: "Distributed Transaction Processing System.".

Pending U. S. Patent Application, SN 08/222,756: "A Data Processing System for Providing User Load Levelling in a Network" (Copy not provided).

*Primary Examiner*—Alvin E. Oberley
*Assistant Examiner*—St. John Courtenay, III
*Attorney, Agent, or Firm*—Jenkins & Gilchrist; Mark S. Walker

[57] ABSTRACT

A data processing system stores and maintains a plurality of security levels for dynamically linked libraries. Upon loading of an application, and upon determination of which dynamically linked libraries are required by the application, the data processing system determines the predefined security level assigned to the application and loads dynamically linked libraries previously encoded with the predefined security level.

22 Claims, 6 Drawing Sheets

USER LEVEL CONTROL OF DEGREE OF CLIENT-SIDE PROCESSING

TECHNICAL FIELD OF THE INVENTION

The present invention relates in general to data processing systems and in particular, to a system and method for determining a level of security for an application running in the data processing system.

BACKGROUND OF THE INVENTION

A data processing system typically includes a processor along with various other pieces of hardware, such as memory, input means and output means. Without more, a data processing system is not able to accomplish much. However, upon inclusion of an operating system, an application program is able to manipulate various portions of the hardware in order to accomplish a task. The operating system ("OS") software is responsible for controlling the allocation and usage of hardware resources such as the memory, central processing unit, disk space, and peripheral devices. The operating system is the foundation on which applications, such as word-processing and spreadsheet programs, are built. Popular operating systems include MS-DOS, the Macintosh OS, OS/2, and UNIX.

Referring to FIG. 1, there is illustrated a block diagram of a typical early development data processing system 100. Memory space 101 was utilized to include the operating system and various other software code to allow applications 103 and 104 to utilize hardware 102.

Referring to FIG. 2, as the development of computers evolved, data processing systems 200 were configured so that the original memory space 101 (see FIG. 1) was divided into two sections by essentially "pushing down" the kernel 201 to a particular portion of the memory space 101. The kernel 201 is the core of an operating system, which manages memory, files, peripheral devices, maintains the time and date, launches applications, and allocates system resources. The remainder 202 of the memory space 101 was left to include, among other things, software code for allocating the kernel 201 and the hardware 102 among various applications 103, 104.

Referring to FIG. 3, there is illustrated the next evolution in computers, wherein data processing system 300 includes basically the same portions as shown in FIG. 2, except for that those portions that resided within memory space 202 have now been "separated" from the kernel 201 into a personality 301 (alternatively an operating system or server). The personality 301 may be implemented with its own separate hardware, or it may be merely separated in software from the kernel 201. The personality 301 implements the Application Programming Interface (API) set of an OS (in that the architecture of a piano is the keyboard, the architecture of an OS is its API set). So all the look and feel of an OS is presented by the personality 301 of the OS. The kernel 201 continues to include those portions of the operating system needed to allocate and manipulate the hardware 102, while the personality 301 includes software code for loading of applications, implementations of locks, high level file systems, memory management, inter-task/process/thread communication, graphics, device interfaces, scheduling control, access to controlled features (re-boot, set time of day), control of other threads/tasks, contingency processing, and real time functions (e.g. priority inheritance, preemption, thread yielding). The personality 301 corresponds to the particular uniqueness of the operating system loaded onto the data processing system 300. For example, particular personalities are UNIX, OS/2, MS-DOS, etc.

One of the primary functions of the personality 301 is to ensure and enforce security within the data processing system 300, ie., it is desired that applications 103 and 104 are given a limited capability of corrupting system 300 by being able to affect the operation of each other, the personality 301, the kernel 201, or the hardware 102. Security is protecting data and control of one task from another (task here is the kernel, a personality, a personality neutral server, or an application). Corruption is one problem (accidentally or intentionally). Others problems are: setting a particular tasks' priority higher than other tasks so that a corresponding product (application) performs better than others, stealing private information, and computer viruses. There are also overt and covert methods of stealing information. An example of an overt method is reading data that belongs to someone else and then simply using the data for your own gain. An example of a covert method is delivering a library routine to a user where the library routine passes back the dollar value of one party's bid via a covert channel (varying disk I/O is the classic) to another task that records the information in an unprotected file so that one can later retrieve the value and sell it to a competitor. Personalities present widely varying degrees of security: from DOS which provides little security up to specialized OSs as used that provide a highly secure environment by the military. Thus, a high security system would require that each application 103, 104 go through the personality 301 for each and every task affecting anything outside of itself. However, it is often desired to allow a particular application to have a capability of performing certain tasks without requiring the application to go through the personality 301, since having to pass everything through the personality 301 places a burden upon personality 301 for its processing time, and it generally slows up the operation of each application 103, 104, the personality 301, and the entire system 300.

Thus, there is a need in the art for a system and method for enabling varying degrees of security within a data processing system in a manner configurable by the user of the data processing system.

SUMMARY OF THE INVENTION

The afore-mentioned need is satisfied by the present invention which is for a system and method for enabling varying degrees of security within a data processing system in a manner configurable by a user of the data processing system.

In a preferred embodiment of the present invention, a data processing system stores a kernel and an operating system in its memory, stores an application in the memory, and then stores a dynamically linked library having an associated predetermined security level in the memory wherein the dynamically linked library is linked or coupled to the application program. The data processing system also provides a means for supporting the predetermined security level of the dynamically liked library, wherein the supporting means is associated with the operating system.

During operation of the data processing system, a determination is made as to what is the desired security level for a particular application program to be loaded onto the system. Upon loading of a particular application program, a determination is made of which dynamically linked libraries are requested, or needed, by the application program. The data processing system then searches for the requested dynamically linked libraries having the security level desired for the application program. These dynamically linked libraries are then loaded along with the application program. If a particular security level has not been set for a requested dynamically linked library, or if a particular dynamically linked library having a certain security level cannot be found, a default dynamically linked library having a default security level will then be loaded along with the application program.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1:
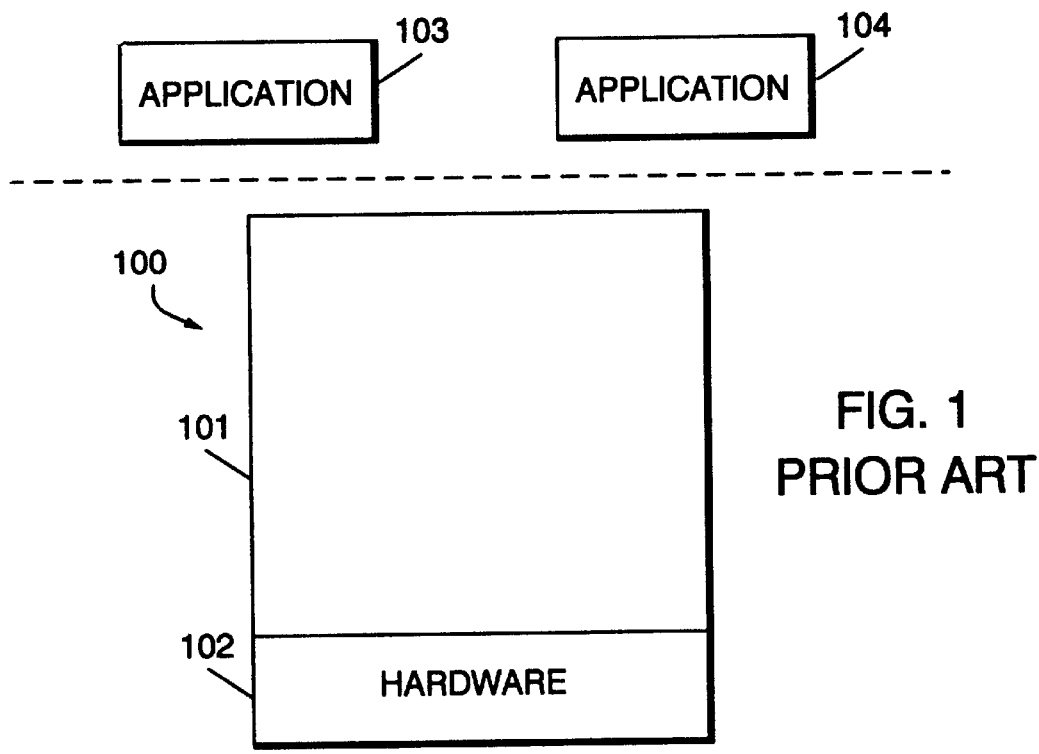
FIG. 1 illustrates a typical early development data processing system.
Figure 2:
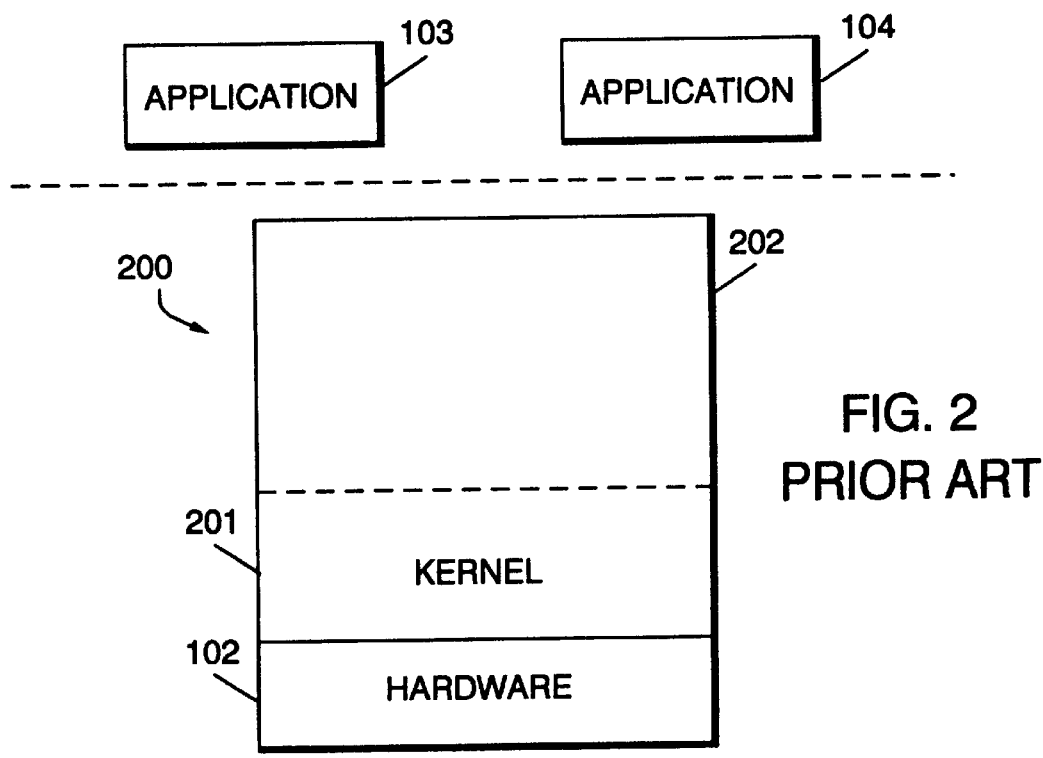
FIG. 2 illustrates a data processing system where the kernel has been separated.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 3:
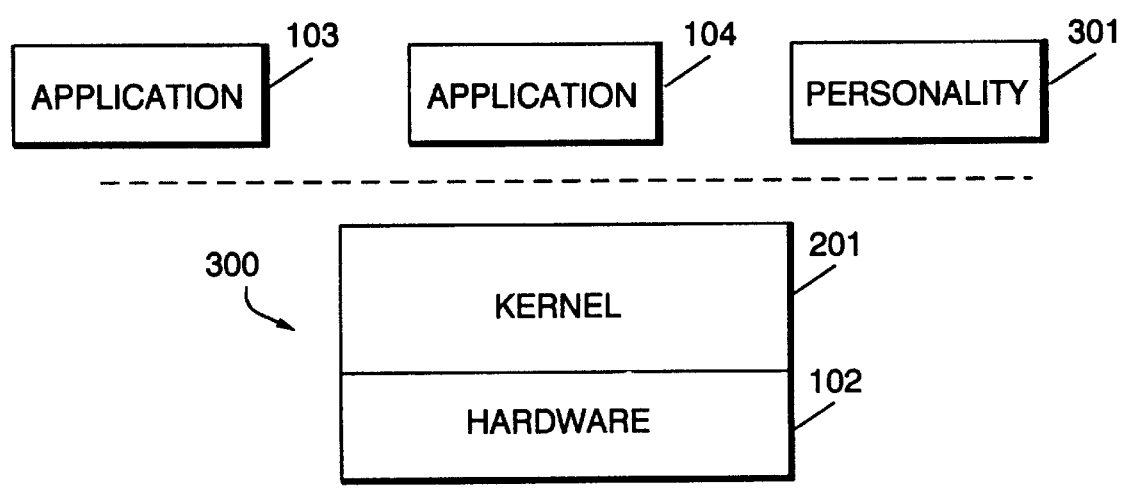
FIG. 3 illustrates a data processing system wherein a personality has been separated from the kernel.
Figure 4:
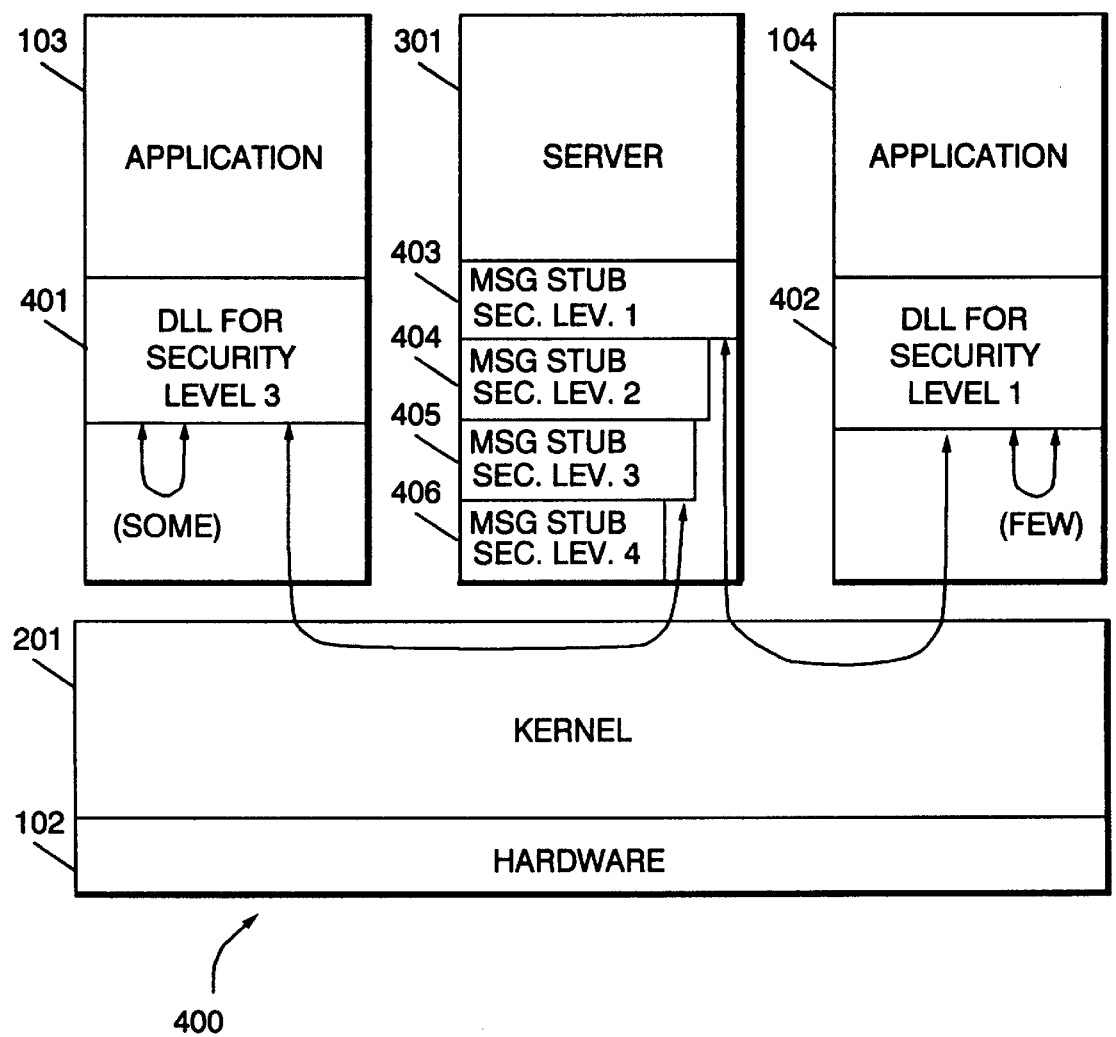
FIG. 4 illustrates a data processing system configured in accordance with the present invention.

Referring to FIG. 4, there is illustrated data processing system 400 comprising hardware 102, kernel 201, server 301, and applications 103 and 104, similarly as discussed above with respect to FIG. 3. Server 301 may implement the semantics of any one of various available operating systems, such as OS/2, AIX 4.0, NT, UNIX, etc.

As applications 103 and 104 are loaded, dynamically linked libraries 401, 402, respectively, are loaded along with the applications 103 and 104. Dynamically linked libraries ("DLL") are well-known in the art. A DLL is a collection of routines stored in a file. Each set of instructions in a library has a name, and each performs a different, often very specific, task, for example, the printf() function as part of the Standard C library and displays characters on the screen. Such sets of instructions simplify work and prevent duplication of effort each time a particular task needs to be carried out. A programmer of an application can identify a library to an application, refer to library routines in the application, and have the application carry out the appropriate task without having to write (or rewrite) the instructions themselves each time they are needed. Thus, DLLs 401, 402 enable applications 103, 104, respectively, to carry out specific tasks without requiring assistance from server 301.

DLL's present the complete API set as mentioned above. The idea here is that one can vary how the APIs are performed (implemented). For example, in a very secure system, the DLL will almost always call the personality 301 and in a low security the DLL might seldom call the personality 301. Thus, in FIG. 4, application 104 has been labeled as using a DLL 402 that implements "few" services (APIs) internally and thus requires (by implication) many messages to the personality 301. On the other hand, the DLL 401 loaded for application 103 implements some services locally and only requires (by implication) a few messages to the server 301 as described below. However, with such freedom also comes less security within system 400. For example, a particular DLL may permit an application to corrupt another application, or even cause undesirable actions to occur within kernel 201 and even hardware 102.

Consider example 1 for RAM based locks. Many applications such as GUI interfaces and database servers require global locks (shared between tasks). The tasks can gain a lot of performance by using locks that are based in shared memory (RAM based) as opposed to based in a personality 301. A lock, even one based in a personality 301, does not take much time. The gain comes from the frequency these locks are used (percent of total time is dependent on the time of a service times the frequency of use). A RAM based lock can frequently be grabbed in a few instructions whereas a message to a personality 301, typically requires several hundred instructions. One problem is that an erroneous task can write randomly through memory and in the process write garbage over a lock variable. This could result in other tasks "thinking" the lock is used with the result that all the applications "hang on a lock" that will never be freed. Another problem occurs when a task terminates while holding a RAM based lock—namely, the system has no way of knowing how to clear these RAM based locks and thus other tasks may again "hang". There are four obvious levels of security here. The first level is a low level of security with the problems mentioned. The second would be a high level of security, where the tasks do not use RAM semaphores and go to the personality 301 for each lock action and thus avoid all the problems above. The third is an intermediate solution whereby the tasks register locks with the personality 301, which can then monitor tasks and clean up locks after well behaved tasks terminate or return locks to a known state and broadcast the reset to clients when a task accidently overwrites the locks. A fourth solution which lies between the second and third levels of security, is to piggy back the lock semantics on a safe kernel based package.

Also, consider example 2 for video buffers. Graphical applications can desire very high-speed manipulation of bits on the computer video display, for example to rotate a picture. If the application is given direct access to the video hardware by enabling access to the video memory and I/O registers in the library, the bits can be updated more quickly than if a message between tasks requiring several hundred instructions is used. However, if the application is able to write on the video hardware at any time, it may draw over what another application (including the kernel) is drawing to the screen.

Additionally, it is desirable to be able to have different security levels for different applications running on system 400. Suggested levels of security (actual choice of levels is subjective):

Level 1: The tasks of an application have direct access to the resources of all applications and system resources (ports, devices, kernel memory, . . . ).

Level 2: The tasks of an application have direct access to the resources of all applications, but limited access to system resources (must be granted access on a case-by-case basis).

Level 3: The tasks of application have direct access to the resources of all applications under the same personality 301, but limited access to system resources.

Level 4: The tasks of an application have direct access to the resources of all tasks for one application, but limited access to system resources or other applications.

Level 5: A task has direct access to the resources of only that task, but limited access to system resources or other tasks.

It may also be desirable to permit a user of system 400 to dynamically change the security level for various applications, such as applications 103 and 104.

In order to implement such varying levels of security, it is required that system 400 implement a machine that provides address space protection, which is well-known in the art. It is also required that system 400 employ a dynamic loading mechanism where references are resolved at run time to a library. Also required are references which are candidates or library references in the client application.

As a result of an ability for a user to dynamically vary security levels for various applications, varying and programmable levels of security may be implemented within system 400. For example, a very high security level will require that an application pass all messaging through server 301 before the message is able to reach any other application, kernel 201 or the hardware 102. A second level of security may be implemented, or encoded, to ensure that a particular application does not corrupt system 400. A third level may be encoded so that a particular application may only corrupt applications of a particular user. Yet another security level may be encoded so that a particular application is only able to corrupt, or effect, itself, while even a more stringent security level will even protect the application from itself. The variation in levels is programmable by the user.

As it is well known in the art, an application often requires one or more DLLs in order to interact with the remainder of the data processing system 400. Thus, the present invention encodes various security levels along with the DLLs required, or requested, by a particular application.

Figure 7:
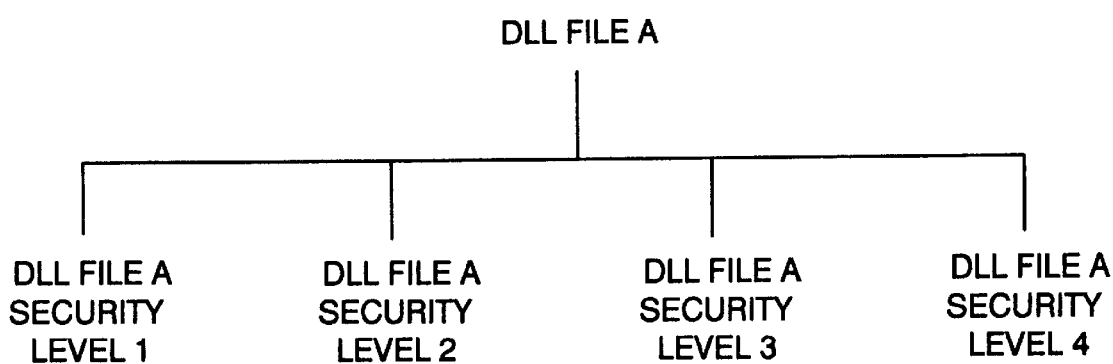
FIG. 7 illustrates a memory tree showing various security level versions of a dynamically linked library file.

Referring to FIG. 7, there is shown a representation of how varying security levels may be implemented with respect to a particular DLL File A. Shown are four different security levels that may be associated with DLL File A. Security level 1 may be the most stringent security level, while security level 4 may be the least stringent security level. As a result, particular codes may be removed (or added) from the security level 1 version of the DLL File A to ensure that an application that receives DLL File A is not able to do certain tasks, and as a result affect certain portions of system 400, while such tasks may be allowed by the other three security levels. As may be readily seen, one application may be provided with a DLL File A having security level 1, while another application may be provided with a security level 3 version of the same DLL File A. The programmer and/or system administrator of system 400 can set the varying security levels as desired by determining which coded tasks are or are not to be provided to certain applications. Once it has been determined what capabilities to provide to a particular application, then the DLL file requested by that application can be modified to the desired security level. Then, upon loading of the application, the DLL file required by the application will be loaded along with the application, relative to the desired security level.

Figure 6:
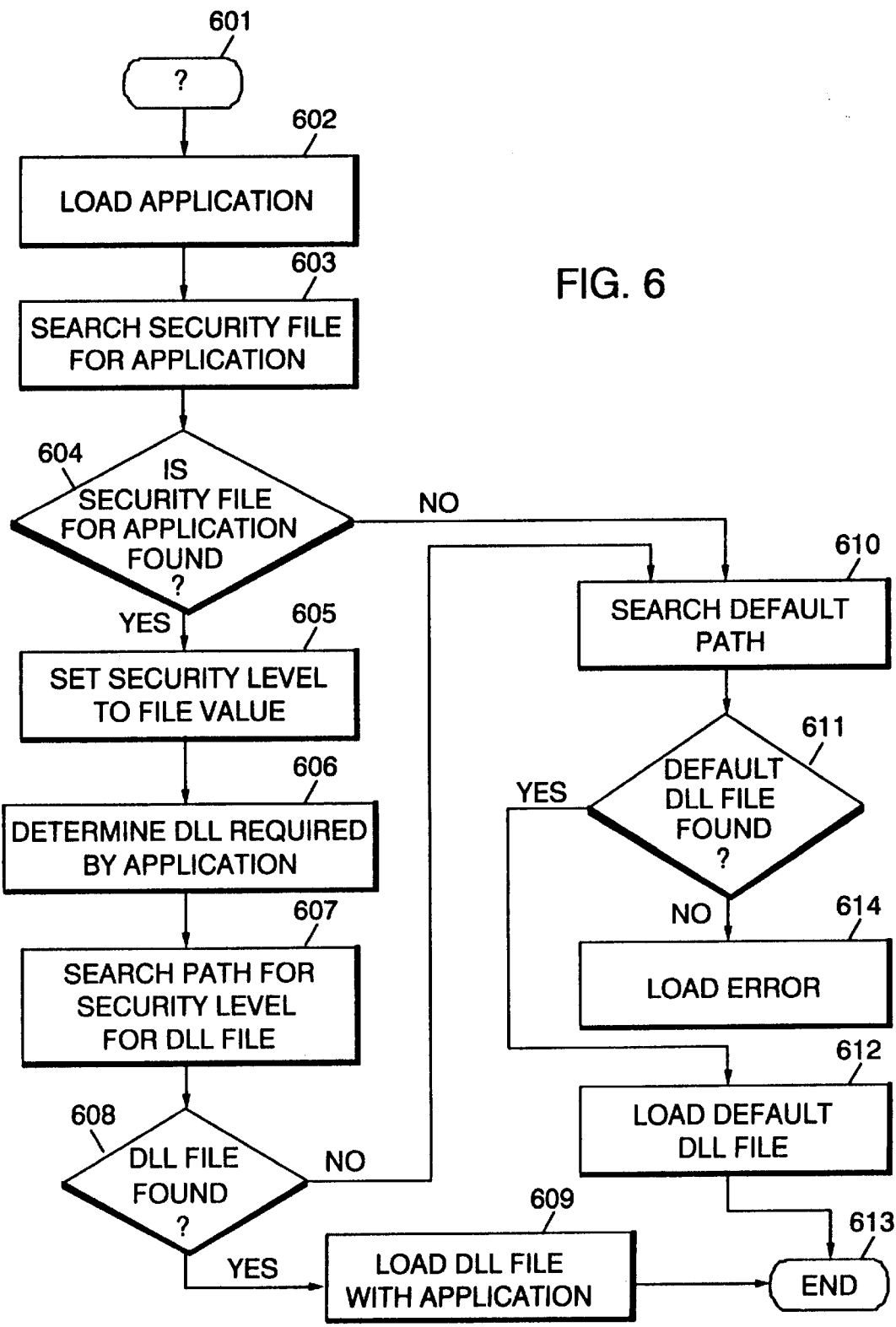
FIG. 6 illustrates a flow diagram of a preferred embodiment of the present invention.

Referring to FIG. 6, there is illustrated a flow diagram illustrating this process. The flow begins with step 601 and proceeds to step 602 wherein the particular applications 103, 104 is loaded into memory by system 400. Next, at step 603, the system searches a security file for the application 103, 104. In other words, a security file can be maintained within system 400 (ie., server 300) which lists the various security levels that are to be provided to particular applications 103, 104. When a particular applications 103, 104 is loaded onto system 400, server 301 will search the security file for applications 103, 104 to determine what security level applications 103, 104 is to receive. In step 604, the system determines whether or not a security file for applications 103, 104 has been found. If yes, the system 400 proceeds to step 605 to set the security level equal to the level found within the security file for applications 103, 104. Thereafter, at step 606, the one or more DLLs required, or requested, by applications 103, 104 are determined. In step 607, the path, such as the one illustrated in FIG. 7, is searched for the requested DLL file(s) having the security level set in step 605. As illustrated in FIG. 4, applications 103, 104 has been loaded along with DLL file 401, 402 having a level 3, 1 security. If in step 605, the security level had been set to a different level, that the DLL file(s) associated with that security level 1 (FIG. 7) would have been loaded instead. In step 608, system 400 determines whether or not the particular DLL file having the desired security level has been found. If yes, the process proceeds to step 609 to load the DLL file(s) having the desired security level along with applications 103, 104. The process ends at step 613.

In step 604 applications 103, 104 is not found within the security file list, or if within step 608 the desired DLL file is not found, the process proceeds to step 610 to search a default path for a DLL having a default security level. Next, at step 611, it is determined whether or not the default DLL file has been found. If yes, the process proceeds to step 612 to load the default DLL file. If the default DLL file is not found, the process proceeds to step 614, wherein a load error has occurred.

Referring next to FIG. 4, applications 103 is shown having been loaded along with DLL file 401 having a level 3 security, while applications 104, which may or may not be the same or similar to application 103, has been loaded with DLL file 402 having a level 1 security. Server 301 implements four levels of security. In this example, security level 1 is a more stringent security level than levels 2, 3, and 4. Since DLL file 401 has a level 3 security, application 103 will have "some" capability to perform tasks on its own without requiring assistance from server 301, while application 104 will require assistance from server 301 more often than application 103 since DLL file 402, having a security level 1, has an ability to only do a "few" tasks on its own.

A further example will help illustrate the above implementation of service levels. Assume application 103 resides on a disk and references DLL File A, which communicates with server 301. Three versions of DLL File A exist corresponding to three different levels of client-side processing. The user of system 400 can specify the desired security level using an interface. A text file may be utilized, but a more elaborate graphical user interface may be implemented to permit a user to set security levels to various applications, and to modify the security levels as desired. Once application 103 is loaded, it is linked to one of the three different levels of DLL File A. To application 103, the interfaces to DLL File A are the same regardless of the various security levels. Server 301 is designed to handle the three security levels. If application 103 is using a communication network, as an example, DLL File A may provide the communication interfaces needed. A most secure version of DLL File A (e.g., security level 1) might send all requests for communications to server 301 from application 103, which could then verify them before allowing such communications to proceed. The second most secure version of the DLL File A might be encoded to send communications connection requests to server 301, but would be able to read/write directly to the connection once it is opened. The least secure library might be encoded to allow application 103 to open, read and write directly to the particular device within hardware 102 required for the communications desired.

Figure 5:
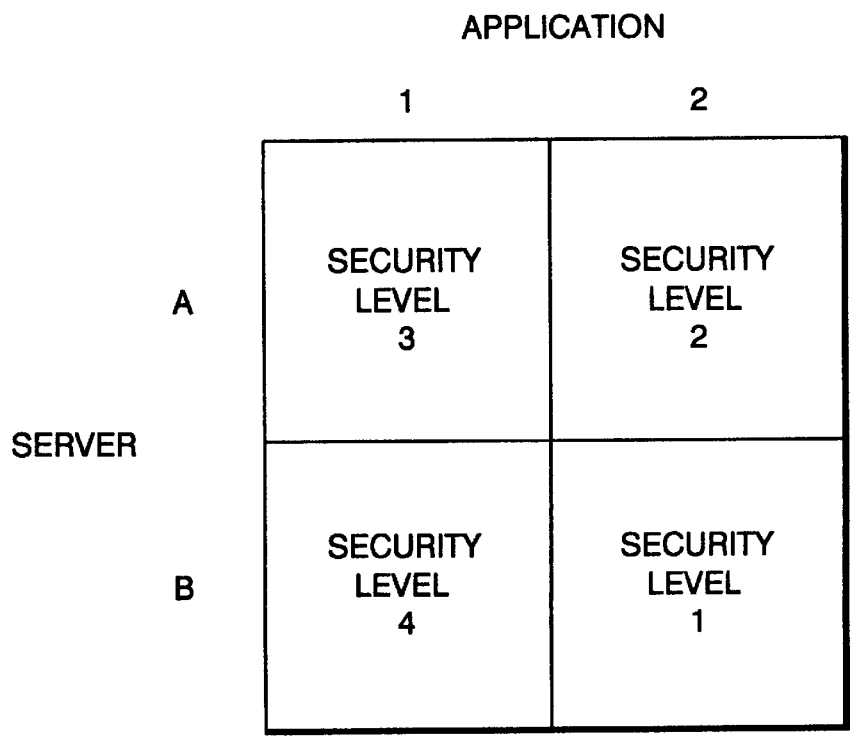
FIG. 5 illustrates a matrix array showing a capability of the present invention to assign various security levels with respect to various applications and servers loaded onto the data processing system.

Referring to FIG. 5, there is illustrated a matrix illustrating how a data processing system employing a plurality of servers and implementing a plurality of applications can be encoded so that a particular server may implement two different security levels for a particular DLL file for two different applications, and the system may be programmed so that two separate servers implement two different security levels for the same application. As illustrated, server A implements a security level 3 for application 1 while implementing a security level 2 for application 2. Server B implements security level 4 for application 1 and security level 1 for application 2. Thus, application 1 has one particular security level when loaded by server A, and has a security level 4 when application 1 is loaded by server B.

Figure 8:
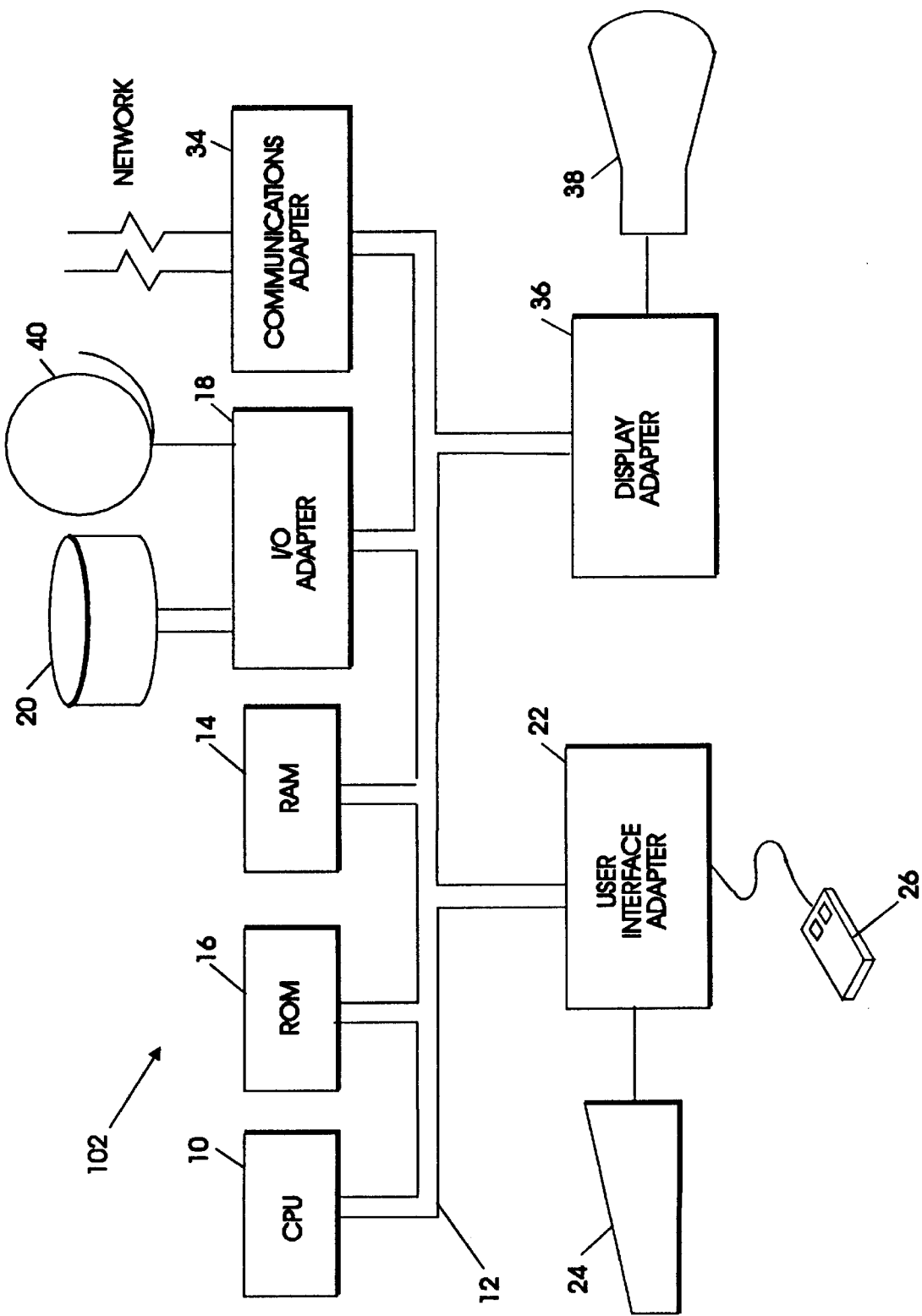
FIG. 8 illustrates a data processing system configurable in accordance with the present invention.

A representative hardware environment 102 for practicing the present invention is depicted in FIG. 8, which illustrates a typical hardware configuration 102 of a workstation in accordance with the subject invention having central processing unit 10, such as a conventional microprocessor, and a number of other units interconnected via system bus 12. The workstation shown in FIG. 8 includes random access memory (RAM) 14, read only memory (ROM) 16, and input/output (I/O) adapter 18 for connecting peripheral devices such as disk units 20 and tape drives 40 to bus 12, user interface adapter 22 for connecting keyboard 24, mouse 26 and/or other user interface devices such as a touch screen device (not shown) to bus 12, communication adapter 34 for connecting the workstation to a data processing network, and display adapter 36 for connecting bus 12 to display device 38. Applications 103, 104 and DLLs 401, 402, and server 301, and the various security levels for any one particular DLL file as illustrated in FIG. 7, may be stored on disk units 20 or tape drives 40 and may then be loaded into RAM 14. Kernel 201 may be stored within disk units 20, tape drives 40, RAM 14 or ROM 16. Implementation of the various security levels for various DLLs may be performed by a user using keyboard 24, display 38 and any other user interface devices that may be implemented with hardware 102.

With the foregoing hardware in mind, it is possible to explain the process-related features of the present invention.

To more clearly describe these features of the present invention, discussion of other conventional features is omitted as being apparent to those skilled in the art. It is assumed that those skilled in the art are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Although the present invention and its advantages have been described in detail, it should be understood that various changes, substitutions and alterations can be made herein without departing from the spirit and scope of the invention as defined by the appended claims.

What is claimed is:

1. A data processing system for setting desired security levels for application programs without modification of the application programs, said system comprising:

a processor, input means, output means, and memory means coupled via a bus; means for storing a kernel and an operating system in said memory means;

means for storing a plurality of different security level versions of selected ones of a plurality of dynamically linked libraries, wherein a security level determines an amount of interaction between said operating system and an application program;

means for loading into said memory means a first application program;

means for storing said first application program in said memory means;

means for determining a security level for said first application program;

means for determining which of said selected ones of a plurality of dynamically linked libraries is requested by said first application program;

means for retrieving, without modifying said first application program, one of said selected ones of a plurality of dynamically linked libraries which incorporates said desired security level for said first application program, wherein said retrieved one of said selected ones of a plurality of dynamically linked libraries which incorporates said desired security level corresponds to said dynamically linked library requested by said first application program;

means for loading into said memory means said one of said selected ones of a plurality of dynamically linked libraries which incorporates said desired security level for said first application program;

means for loading a dynamically linked library having a default security level when said one of said selected ones of a plurality of dynamically linked libraries which incorporates said desired security level for said first application program is not retrievable;

means for loading into said memory means said dynamically linked library having a default security level when said desired security level for said first application program cannot be determined;

means for loading into said memory means a message stub which allows said operating system, which loaded said first application program, to support said desired security level for said first application program;

means for loading into said memory means a second application program;

means for storing said second application program in said memory means;

means for determining what is the desired security level for said second application program;

means for determining which of said selected ones of a plurality of dynamically linked libraries is requested by said second application program;

means for retrieving, without modifying said second application program, one of said selected ones of a plurality of dynamically linked libraries which incorporates said desired security level for said second application program, wherein said retrieved one of said selected ones of a plurality of dynamically linked libraries which incorporates said desired security level corresponds to said dynamically linked library requested by said second application program;

means for loading into said memory means said one of said selected ones of a plurality of dynamically linked libraries which incorporates said desired security level for said second application program;

means for loading into said memory means a dynamically linked library having a default security level when said one of said selected ones of a plurality of dynamically linked libraries which incorporates said desired security level, for said second application program is not retrievable;

means for loading into said memory means said dynamically linked library having a default security level when said desired security level for said second application program cannot be determined; and means for loading into said memory means a message stub which allows said operating system, which loaded said second application program, to support said desired security level for said second application program.

2. The system as recited in claim 1, wherein said desired security level for said second application program is different than said desired security level for said first application program.

3. The system as recited in claim 1, further comprising:

means for storing a second operating system in said memory means, wherein said second operating system loads said second application program, wherein said first and second application programs are identical application programs, and wherein said desired security level for said second application program is different than said desired security level for said first application program.

4. A data processing system comprising:

a processor, input means, output means, and memory means coupled via a bus;

means for storing a kernel and an operating system in said memory means;

means for storing one or more application programs in said memory means;

means for defining one or more security levels;

means for storing one or more dynamically linked libraries in said memory means, each dynamically linked library associated with one of the defined security levels;

means for loading an application program; and means for linking, without modifying the application program, one or more of the dynamically linked libraries to an application program when the application program is loaded, wherein the security level of each dynamically linked library linked to the application program is a desired security level of the application program, and wherein the security level of each dynamically linked library determines a degree of access the application program has to one or more system resources, and wherein each time the application program is loaded, it may be linked to different dynamically linked libraries at different security levels.

5. A system according to claim 4, wherein said means for loading further comprises means for determining the desired security level of the application program.

6. A system according to claim 4, wherein said means for loading further comprises means for determining which dynamically linked libraries are requested by the application program.

7. A system according to claim 4, further comprising:

means for storing plural copies of each dynamically linked library, wherein each copy of a particular dynamically linked library is associated with a different one of the defined security levels.

8. A system according to claim 4 wherein each defined security level determines an amount of interaction between said operating system and said application program.

9. A system according to claim 4, further comprising means for supporting each of the defined security levels, said supporting means stored in association with said operating system.

10. A system according to claim 5, further comprising:

when the desired security level of an application program can not be determined, means for linking one or more of the dynamically linked libraries to the application program, wherein the security level of each dynamically linked library is a default security level.

11. A system according to claim 7, further comprising:

when a dynamically linked library requested by the application program is not retrievable at the desired security level of the application program, means for linking the requested dynamically linked library at a default security level.

12. In a data processing system, a method for setting a desired security level for an application program, said method comprising the steps of:

defining one or more security levels;

storing one or more dynamically linked libraries, each dynamically linked library associated with one of the defined security levels;

loading the application program; and linking, without modifying the application program, one or more of the dynamically linked libraries to the application program, wherein the security level of each dynamically linked library is the desired security level of the application program, and wherein the security level of each dynamically linked library determines a degree of access the application program has to one or more system resources, and wherein each time the application program is loaded, it may be linked to different dynamically linked libraries at different security levels.

13. A method according to claim 12, wherein said loading step further comprises the step of determining the desired security level of the application program upon initiating said loading of the application program.

14. A method according to claim 12, wherein said loading step further comprises the step of determining which dynamically linked libraries are requested by the application program.

15. A method according to claim 12, further comprising the step of:

storing plural copies of each dynamically linked library, wherein each copy of a particular dynamically linked library is associated with a different one of the defined security levels.

16. A method according to claim 12 wherein said defining step comprises defining one or more security levels wherein each defined security level determines an amount of interaction between said operating system and said application program.

17. A method according to claim 13, further comprising the step of:

when the desired security level of the application program can not be determined, linking one or more of the dynamically linked libraries to the application program, wherein the security level of each dynamically linked library is a default security level.

18. A method according to claim 14, further comprising the step of:

when a dynamically lined library requested by the application program is not retrievable at the desired security level of the application program, linking the requested dynamically linked library at a default security level.

19. In a data processing system, a method for setting a desired security level for an application program, said method comprising:

storing a kernel and an operating system in a memory means;

storing a plurality of different security level versions of selected ones of a plurality of dynamically linked libraries, wherein a security level determines an amount of interaction between said operating system and an application program;

loading into said memory means an application program;

storing said application program in said memory means;

determining a security level for said application program;

determining which of said selected ones of a plurality of dynamically linked libraries is requested by said application program;

retrieving, without modifying said application program, one of said selected ones of a plurality of dynamically linked libraries which incorporates said desired security level for said application program, wherein said retrieved one of said selected ones of a plurality of dynamically linked libraries which incorporates said desired security level corresponds to said dynamically linked library requested by said application program; and loading into said memory means said one of said selected ones of a plurality of dynamically linked libraries which incorporates said desired security level for said application program.

20. The method of claim 19, further comprising:

loading a dynamically linked library having a default security level when said one of said selected ones of a plurality of dynamically linked libraries which incorporates said desired security level for said application program is not retrievable.

21. The method of claim 20, further comprising:

loading into said memory means said dynamically linked library having a default security level when said desired security level for said application program cannot be determined.

22. The method of claim 19, further comprising:

loading into said memory means a message stub which allows said operating system, which loaded said application program, to support said desired security level for said first application program.

* * * * *